US010458399B2

(12) United States Patent
Matson

(10) Patent No.: US 10,458,399 B2
(45) Date of Patent: Oct. 29, 2019

(54) PRECISION FUEL ADDITIVE SYSTEM

(71) Applicant: Harry Stephen Matson, Gainesville, GA (US)

(72) Inventor: Harry Stephen Matson, Gainesville, GA (US)

( * ) Notice: Subject to any disclaimer, the term of this patent is extended or adjusted under 35 U.S.C. 154(b) by 280 days.

(21) Appl. No.: 15/396,081

(22) Filed: Dec. 30, 2016

(65) Prior Publication Data

US 2018/0187663 A1    Jul. 5, 2018

(51) Int. Cl.
| | | |
|---|---|---|
| *F04B 13/00* | (2006.01) |
| *F04B 9/04* | (2006.01) |
| *F04B 49/22* | (2006.01) |
| *F02M 25/00* | (2006.01) |
| *F04B 17/03* | (2006.01) |
| *F04B 17/04* | (2006.01) |
| *F04B 15/04* | (2006.01) |
| *F04B 43/04* | (2006.01) |
| *F04B 53/20* | (2006.01) |
| *F04B 53/08* | (2006.01) |
| *B01D 29/35* | (2006.01) |
| *F04B 23/02* | (2006.01) |
| *F04B 53/14* | (2006.01) |

(52) U.S. Cl.
CPC .............. *F04B 13/00* (2013.01); *B01D 29/35* (2013.01); *F02M 25/00* (2013.01); *F04B 9/042* (2013.01); *F04B 15/04* (2013.01); *F04B 17/03* (2013.01); *F04B 17/04* (2013.01); *F04B 43/04* (2013.01); *F04B 49/22* (2013.01); *F04B 53/08* (2013.01); *F04B 53/20* (2013.01); *B01D 2201/0461* (2013.01); *B01D 2201/345* (2013.01); *F04B 23/02* (2013.01); *F04B 53/14* (2013.01)

(58) Field of Classification Search
CPC .......... F04B 9/042; F04B 13/00; F04B 15/04; F04B 17/03; F04B 17/04; F04B 43/04; F04B 49/22; F04B 49/24; F04B 53/20; F02M 25/00; B01D 29/35

See application file for complete search history.

(56) References Cited

U.S. PATENT DOCUMENTS

| 3,645,416 A * | 2/1972 | Main, Jr. ................ B65D 90/52 |
| | | 220/563 |
| 4,161,160 A * | 7/1979 | Hicks ..................... F02M 43/00 |
| | | 123/1 A |
| 4,329,945 A * | 5/1982 | Beech .................... F02D 19/12 |
| | | 123/25 B |
| 6,068,672 A | 5/2000 | Watson |
| 6,422,266 B1 * | 7/2002 | Gouzou ................. F02M 25/00 |
| | | 123/1 A |

(Continued)

*Primary Examiner* — Ryan A Reis

(57) ABSTRACT

A precision additive dosing device comprising a liquid additive tank, dosing pump, filter, electric actuator, and pump control unit. Upon completion of fueling, the control unit is input with the corresponding volume of fuel just delivered. The pump starts until a time is reached that achieves the correct blend of additive for the fuel. The dosing pump delivers a constant volume of additive with time being the only variable to achieve the correct ratio of additive to fuel. Operation of the pump may be delayed or the time of pump operation may be increased during low ambient temperatures by the pump control circuit. Additionally, a heater may be used to heat the additive in similarly low temperatures.

11 Claims, 17 Drawing Sheets

(56) References Cited

U.S. PATENT DOCUMENTS

| | | | |
|---|---|---|---|
| 7,270,088 B2* | 9/2007 | Whitehall | F02M 25/00 123/1 A |
| 8,109,739 B2 | 2/2012 | Wrench | |
| 8,186,978 B2 | 5/2012 | Tinholt | |
| 2006/0254535 A1* | 11/2006 | Valentine | F02D 33/006 123/1 A |
| 2007/0209607 A1* | 9/2007 | Williams | F02D 19/12 123/1 A |
| 2007/0240649 A1* | 10/2007 | Freeman | F02D 19/12 123/1 A |

* cited by examiner

PRECISION FUEL ADDITIVE SYSTEM

CROSS REFERENCE TO RELATED APPLICATIONS

None

FEDERALLY SPONSORED RESEARCH

Not Applicable

SEQUENCE LISTING OR PROGRAM

Not Applicable

BACKGROUND

Field

This application relates to devices that regulate the flow of additive materials used in fuel systems to increase fuel economy, lubricity, and/or emissions reduction in internal combustion engines.

Prior Art

Many liquid fuel additives are on the market today to reduce emissions, wear on engines, and increase fuel economy by reducing friction in moving parts and providing for a more complete combustion of fuel. These additives, although containing beneficial molecules to aid combustion and reduce emissions, often have corrosive properties. Any fuel additive dispensing system must be able to withstand corrosion.

Additionally, there are issues with the incompatibilities of diesel fuel with additives in pipelines when a jet fuel is also transported in the same pipelines. Consequently, fuel additives need to be added after the fuel is distributed and after refining. Although there is little doubt of the benefits of these fuel additives, the key is dispensing the correct amount into the fuel tank.

The engines of diesel trucks are subjected to additional concerns. These trucks need to withstand wide temperature and environmental changes. Fuel additives must dispense at temperatures between 100° F. and −30° F. since long haul trucks require the same additive protection as consumer vehicles.

U.S. Pat. No. 6,068,672 to Watson (2000) and U.S. Pat. No. 7,270,088 to Whitehall (2007) teaches the addition of a fuel additive into the return fuel stream. When this is done the volume will vary depending on the load from the engine.

U.S. Pat. No. 8,109,739 to Wrench (2012) and U.S. Pat. No. 8,186,978 to Tinholt (2012) are examples of pumps with a reciprocating pumping member that can be used for the dosing of fuel additives. These pumps, however, are more difficult to manufacture than the embodiment in FIG. 14. With several plates making up the body of the disclosed pump, it lends itself to high speed laser cutting and thereby drastically reduces the amount of manual or CNC machining required to manufacture.

SUMMARY

In accordance with one embodiment, the precision additive dosing device comprises a fuel additive tank, a filter assembly, a heater, a level sensor, a dosing pump, a solenoid valve for directing the fluid, and pump control unit. Upon completion of fueling, the control unit is input with the corresponding volume of fuel just delivered. Once the pumping cycle starts, fuel additive passes through a filter to the pump. Additive is sent to a solenoid valve which can deliver the additive to either a primary fuel tank or second fuel tank used for refrigeration. The pump starts until a time is reached that achieves the correct blend of additive for the fuel.

DRAWINGS

Figure 1:
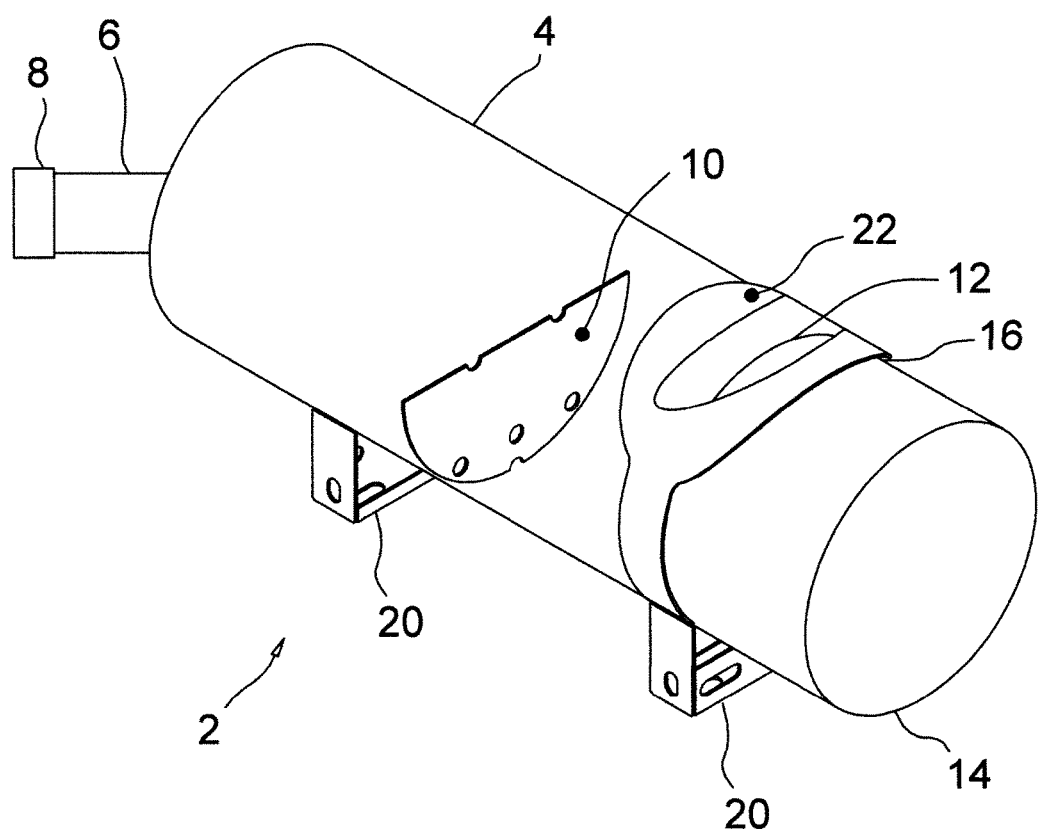
FIG. 1 is an isometric view of a fuel additive tank with an optional internal baffle shown in hidden lines in accordance with one embodiment. The optional logo band and base plate are also shown.

| DRAWINGS - Reference Numerals | |
|---|---|
| 2 | additive tank |
| 4 | tank body |
| 6 | fill tube |
| 8 | vented Cap |
| 10 | baffle plate |
| 12 | end plate |
| 14 | end cover |
| 16 | seal |
| 18 | heater |
| 20 | mounting bracket |
| 22 | logo band |
| 24 | vibration isolator |
| 26 | remote control |
| 28 | volume button |
| 30 | increase button |

DRAWINGS - Reference Numerals

| | |
|---|---|
| 32 | display |
| 34 | start button |
| 36 | dosing pump |
| 38 | filter assembly |
| 40 | outlet port |
| 42 | filter |
| 44 | inlet spool |
| 46 | compression spring (filter) |
| 48 | filter seal |
| 50 | upper seal |
| 52 | stem |
| 54 | stem retaining nut |
| 58 | inlet hole |
| 60 | electric motor |
| 62 | internal retaining nut |
| 64 | external retaining nut |
| 66 | front motor bracket |
| 68 | rear motor bracket |
| 70 | motor shaft |
| 72 | motor bearing |
| 74 | elliptical cam |
| 76 | piston bearing |
| 78 | piston |
| 80 | shoulder screw |
| 82 | outer housing |
| 84 | pump manifold |
| 86 | washer |
| 88 | piston seal |
| 90 | compression spring (pump) |
| 92 | inlet check valve |
| 94 | outlet check valve |
| 96 | level sensor |
| 98 | single motor mounting plate |
| 100 | cam groove |
| 102 | motor bracket |
| 104 | cam disk |
| 106 | motor shaft |
| 108 | thrust washer/bearing |
| 110 | disk housing |
| 112 | shaft bearing |
| 114 | piston |
| 116 | disk surface |
| 118 | cam lobe |
| 120 | inner housing |
| 122 | compression spring |
| 124 | pump chamber |
| 126 | valve block |
| 128 | inlet check valve |
| 130 | outlet check valve |
| 132 | piston seal |
| 134 | solenoid actuator |
| 136 | inlet port |
| 138 | pump body |
| 140 | piston |
| 142 | outlet check valve |
| 144 | piston housing |
| 146 | adapter plate |
| 148 | front support plate |
| 150 | spacer plate |
| 152 | piston support plate |
| 154 | motor mounting plate |
| 156 | side plates |
| 158 | pump mounting plate |
| 160 | orifice |
| 162 | outlet tube |
| 164 | relief valve |
| 166 | relief tube |
| 168 | controller |
| 170 | single check valve |
| 172 | inline filter |
| 174 | fuel tank |
| 176 | reefer tank |
| 178 | solenoid valve |

DETAILED DESCRIPTION

Figure 2:
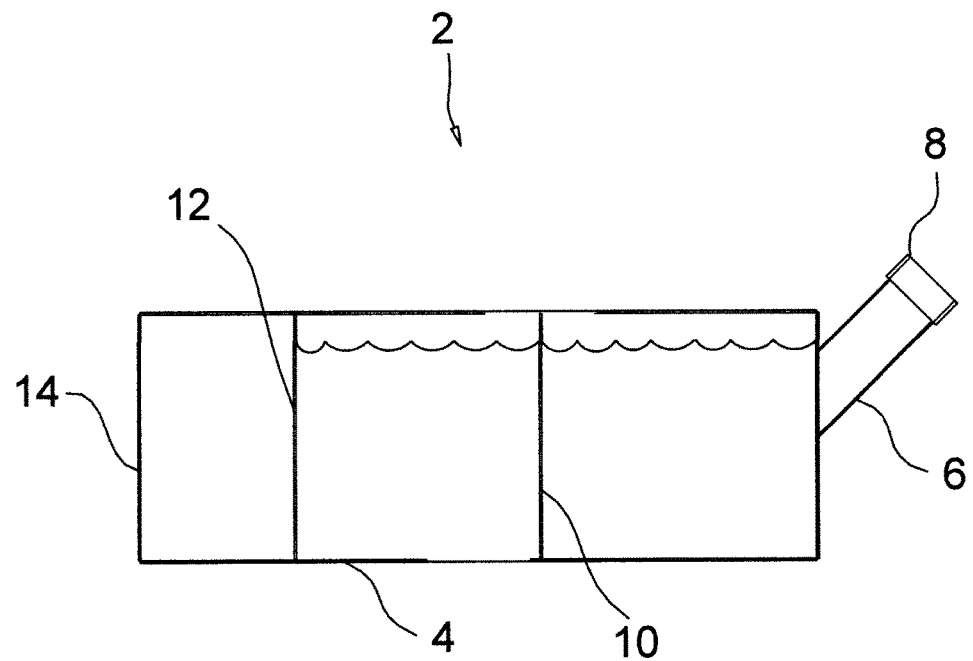
FIG. 2 is an elevation view of a fuel additive tank in a horizontal position in accordance with one embodiment.
Figure 3:
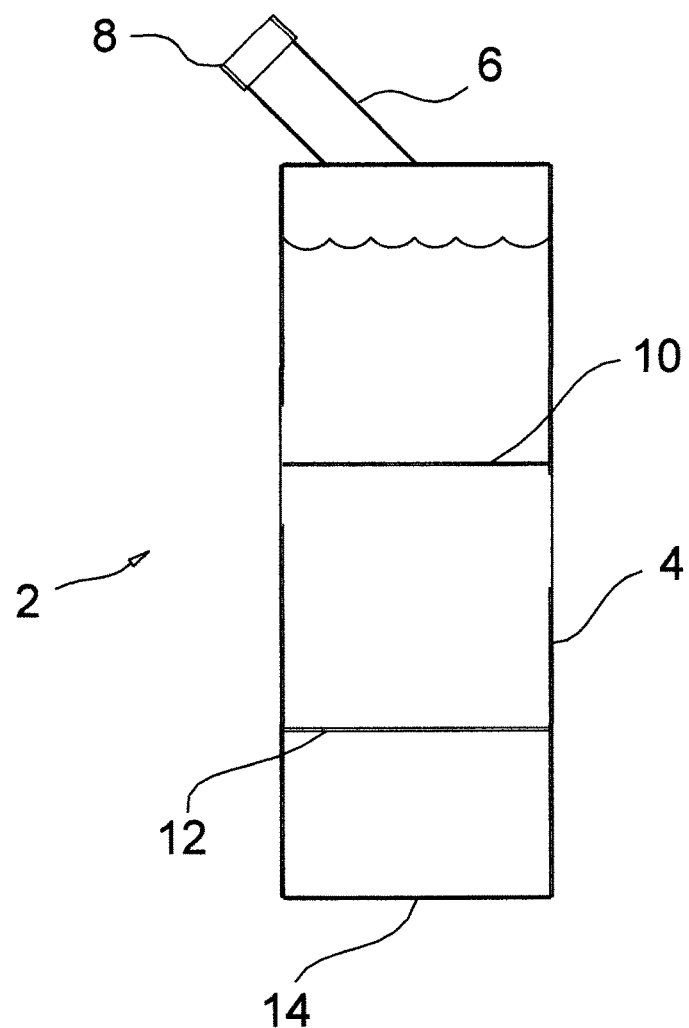
FIG. 3 is an elevation view of a fuel additive tank in a vertical position in accordance with one embodiment.
Figure 4:
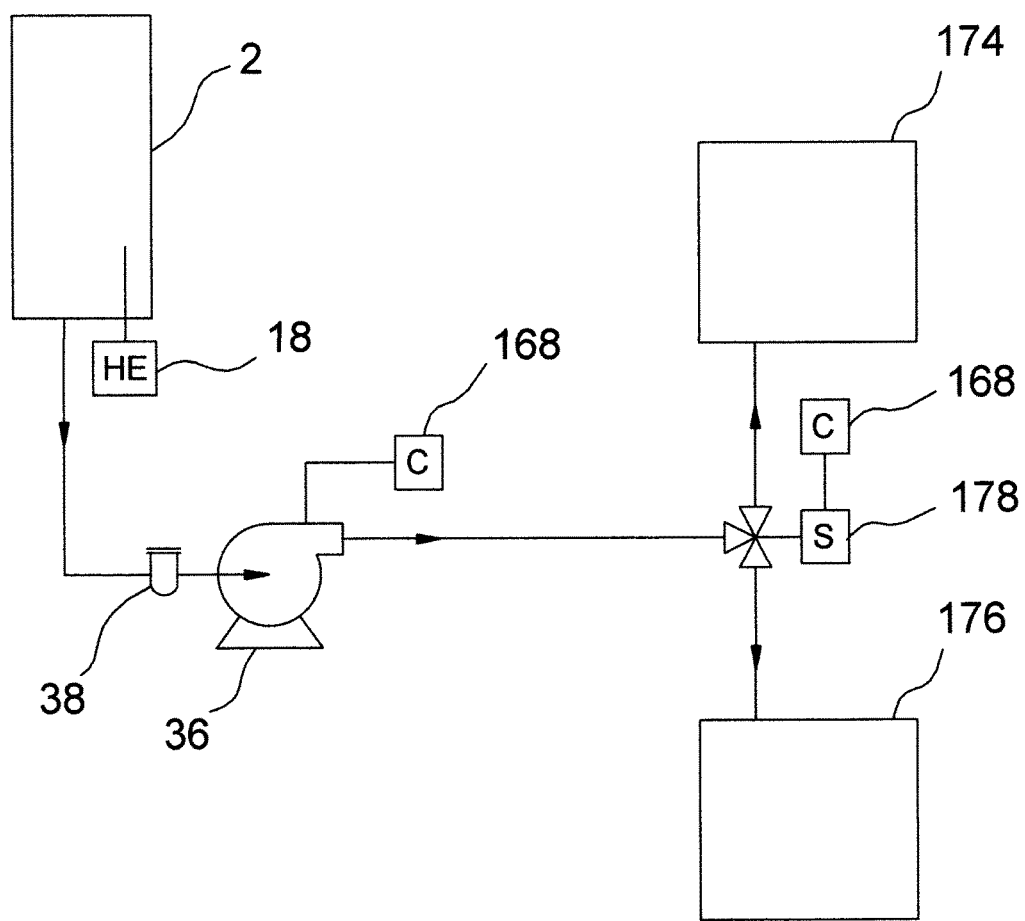
FIG. 4 is a piping and instrumentation diagram showing a valve that may be switched to provide fuel additive to either a vehicle or refrigeration unit fuel tank in accordance with one embodiment.
Figure 5:
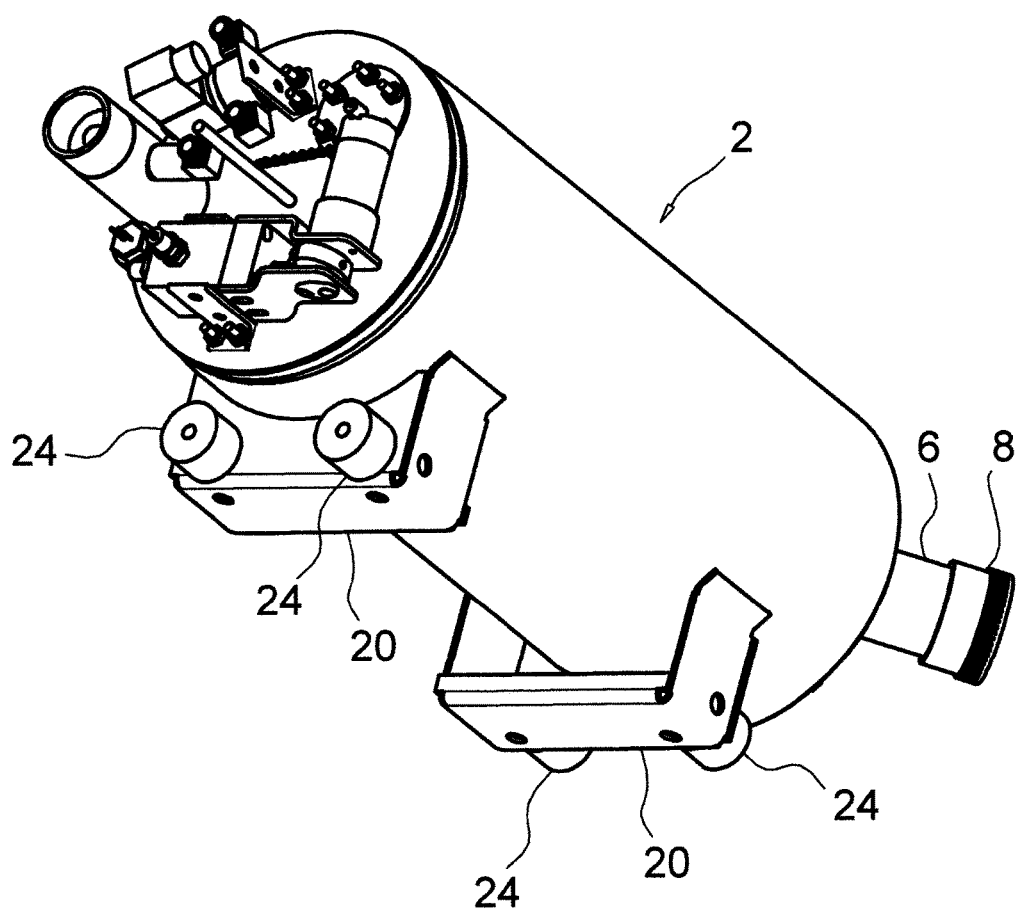
FIG. 5 is an isometric view of a fuel additive tank with the bottom enclosure and circuit board removed for clarity in accordance with one embodiment.

One embodiment of the additive tank (2) is shown in FIGS. 1-5. The additive tank (2) preferably consists of an enclosed tank body (4), a fill tube (6), a vented cap (8), at least one baffle plate (10), an end plate (12), and an end cover (14). Fuel additive is filled through the fill tube (6) of the tank (2) and is closed with a vented cap (8). One or more baffle plates (10) keep the fuel additive from sloshing while the vehicle is in motion. The end plate (12) facilitates mounting of pump, valve, and other components securely. An end cover (14) and chemical resistant seal (16) keep these pump section components away from the elements. The logo band (22) has a utilitarian function to tighten the seal (16) against the outside wall of the tank (2). As ambient temperatures drop, the viscosity of many fuel additives increases. To combat this, a heater (18) may be employed before the fuel additive is dispensed. Further, the tank (2) uses mounting brackets (20) to mount the additive tank (2) to the vehicle if a cylindrical tank is used. It is a further advantage of this embodiment, that the additive tank (2) may be mounted horizontally or vertically as shown in FIGS. 2 and 3 respectively.

Since equipment that is mounted on the exterior of a truck needs to be cosmetically sound, a logo band (22) may be used to provide advertising for the additive in use as well as providing an alternate seal between the bottom of the tank (2) and the end cover (14). Due to road vibration, vibration isolators (24) are used to protect the components of the additive device.

Figure 6:
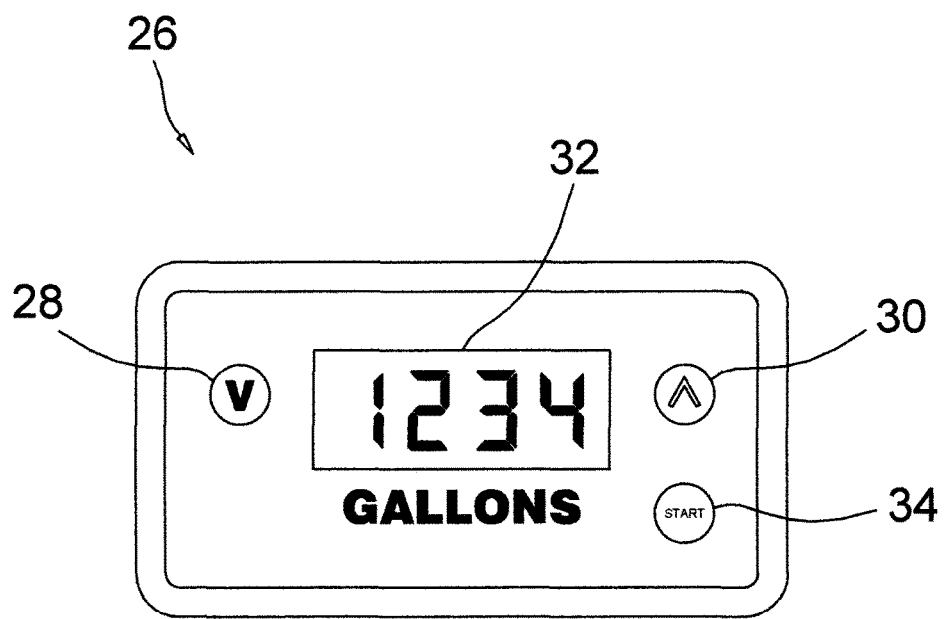
FIG. 6 is a frontal view of a wireless remote control in accordance with one embodiment.
Figure 7:
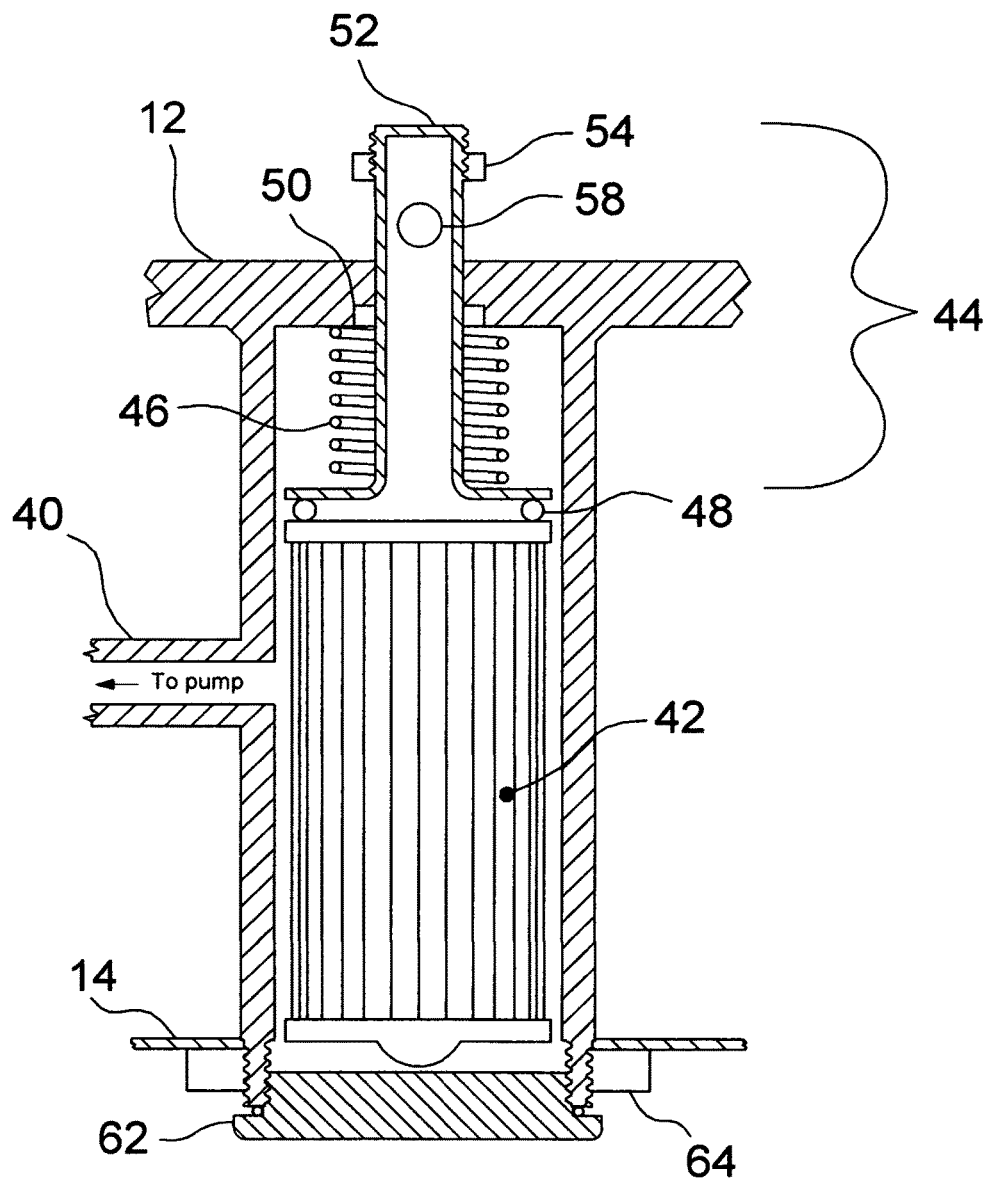
FIG. 7 is a sectional view of a filter assembly in accordance with one embodiment.
Figure 8:
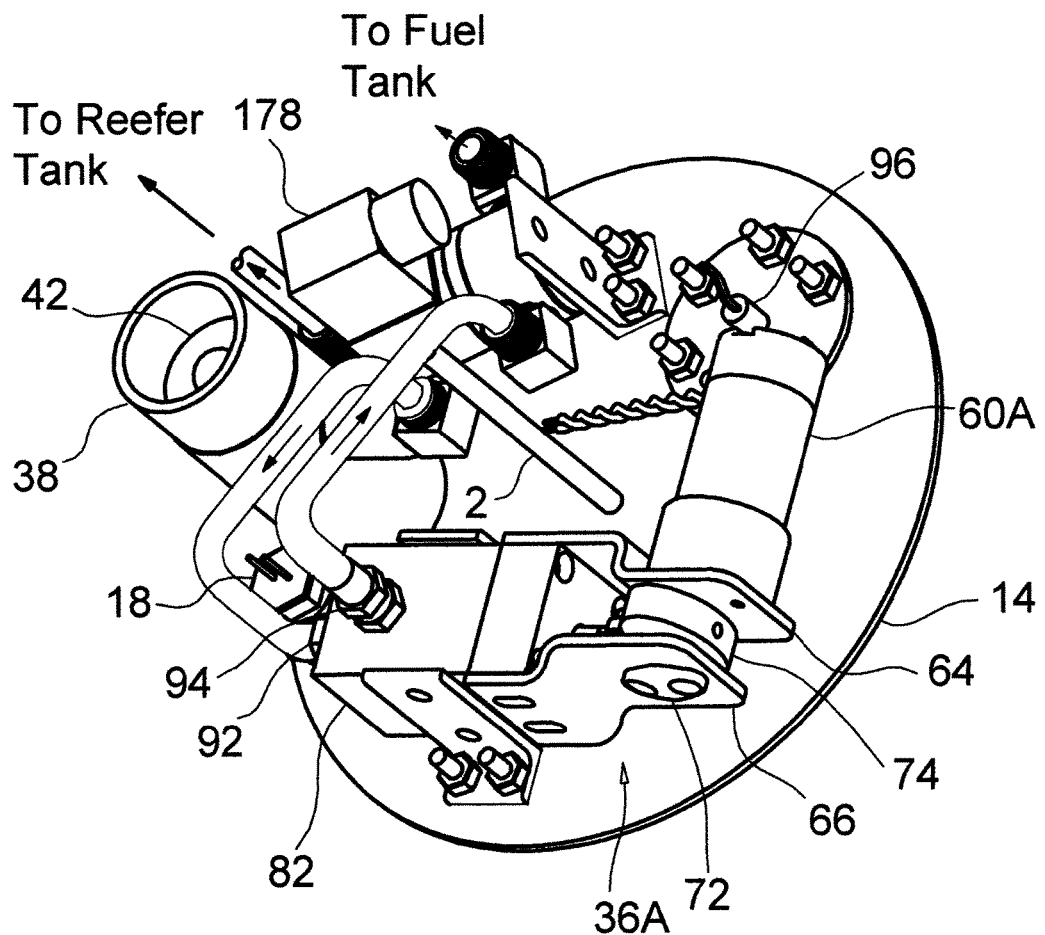
FIG. 8 is an enlarged isometric view of the fuel additive pumping mechanism in accordance with one embodiment.
Figure 9:
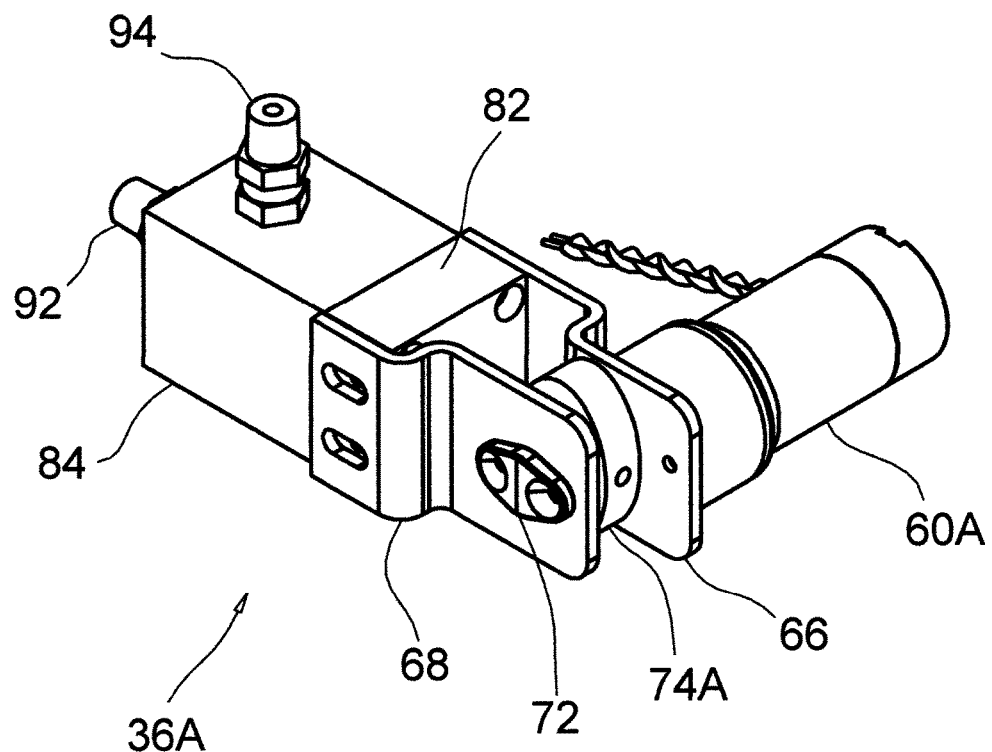
FIG. 9 is an isometric view of an elliptical cam operated fuel additive pump in accordance with one embodiment.
Figure 10:
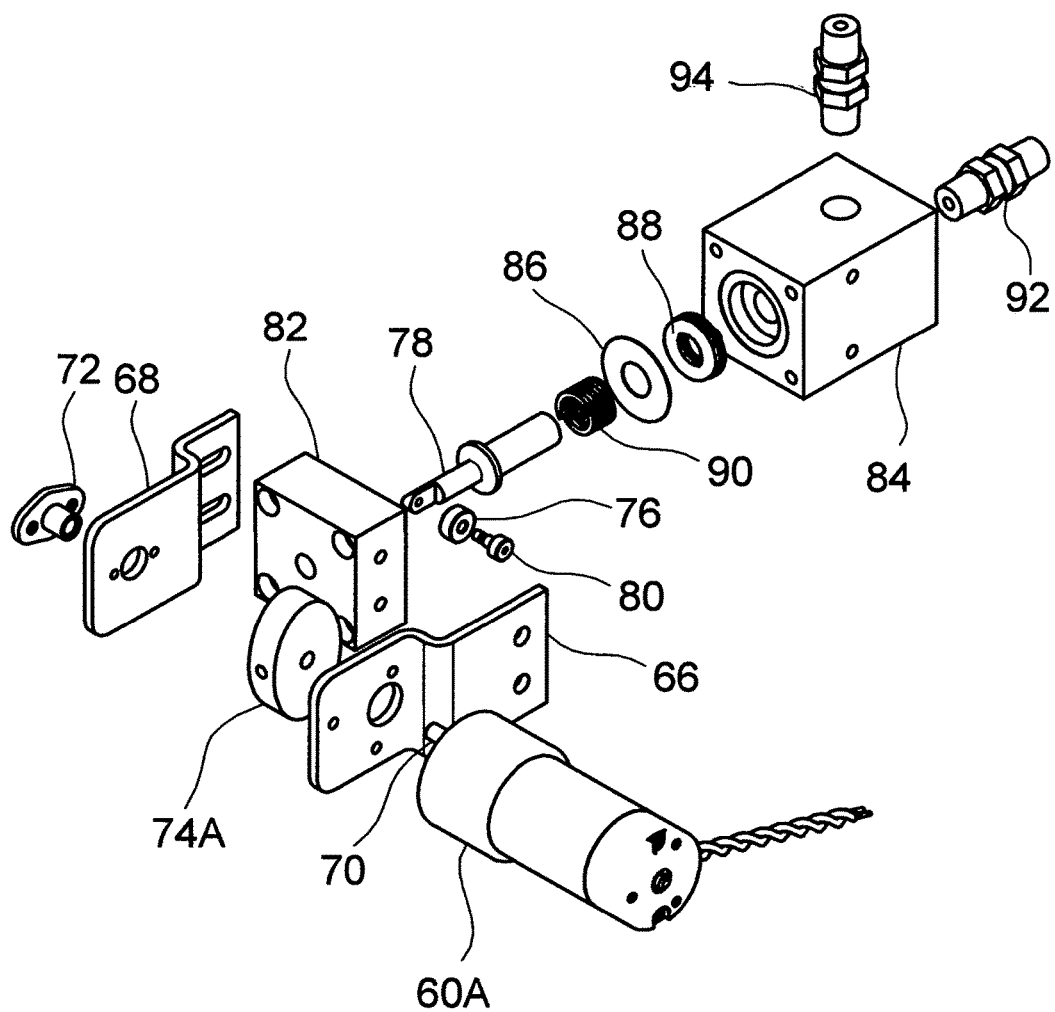
FIG. 10 is an exploded view of an elliptical cam operated fuel additive pump in accordance with one embodiment.

Upon completion of the refueling of a vehicle, the remote control (26), FIG. 6, is reset or computer application is started and the corresponding number of gallons or liters of fuel that were added to the fuel tank is input to the device (26) by pressing the "V" (28) or up arrow (30) button. Once the dosing operation is started with the remote control (26) using the start button (34), the dosing pump (36) is energized and pumps for a time corresponding to the volume of fuel input with the remote control device (26). The dosing pump (36) preferably provides a known volume per unit of time when operating. With a membership type fuel card the input is achieved automatically via a proprietary Smart Device Application.

Additive passes through the end plate (12) of the tank (2) and through a filter assembly (38) and to the filter outlet port (40). The filter assembly (38) is preferably comprised of a filter (42), an inlet spool (44) with a compression spring (46), and filter seal (48). An upper seal (50) may be used against the stem (52) of the inlet spool (44) to prevent leakage to the housing cavity near the spring (46). During fabrication, a stem retaining nut (54) is used to keep the spool (44) from coming out of the end plate (12). To change the filter (42), the internal retaining nut (62) is removed allowing the spring (46) to extend which moves the inlet hole (58) below the tank end plate (12). This seals the inlet hole (58) to prevent excess additive from draining from the tank. The old filter (42) is removed and replaced. When a new or clean filter (42) is reinserted, the spring (46) compresses and forces the inlet spool (44) to extend into the tank. Once the internal retaining nut (62) is secured, the inlet hole (58) is now inside the tank cavity allowing fuel additive to reenter the filter (42). Additive is then available to be moved to the pump (36) through the outlet port (40). The internal retaining nut (62) is used to retain the filter (42). An external retaining nut (64) can be removed to gain access to the pump and controller circuitry. This external retaining nut (64) is used to keep the filter assembly firmly in place against the cover (14) when changing the filter (42).

One embodiment of the fuel additive pump is shown in FIGS. 8-11. The pump (36A) comprises an electric motor (60A) attached to front (66) and rear (68) motor brackets. The shaft of the motor (70) preferably rotates in a motor bearing (72) attached to the rear motor bracket (68). An elliptical cam (74A) is attached to the motor shaft (70) which contacts a bearing (76) attached to the piston (78) with a shoulder screw (80). When the motor (60A) starts, the cam (74A) drives the piston (78) through an outer housing (82) and into a cylindrical cavity in the pump manifold (84). A washer (86) and piston seal (88) keep fluid from escaping the pump manifold (84). A compression spring (90) forces the piston outward once the elliptical cam (74A) rotates. An inlet (92) and outlet (94) check valve keep the additive flowing in one direction out of the pump (36A). A level sensor (96) stops the pump (36A) when fuel additive is low in the tank (2).

Figure 11:
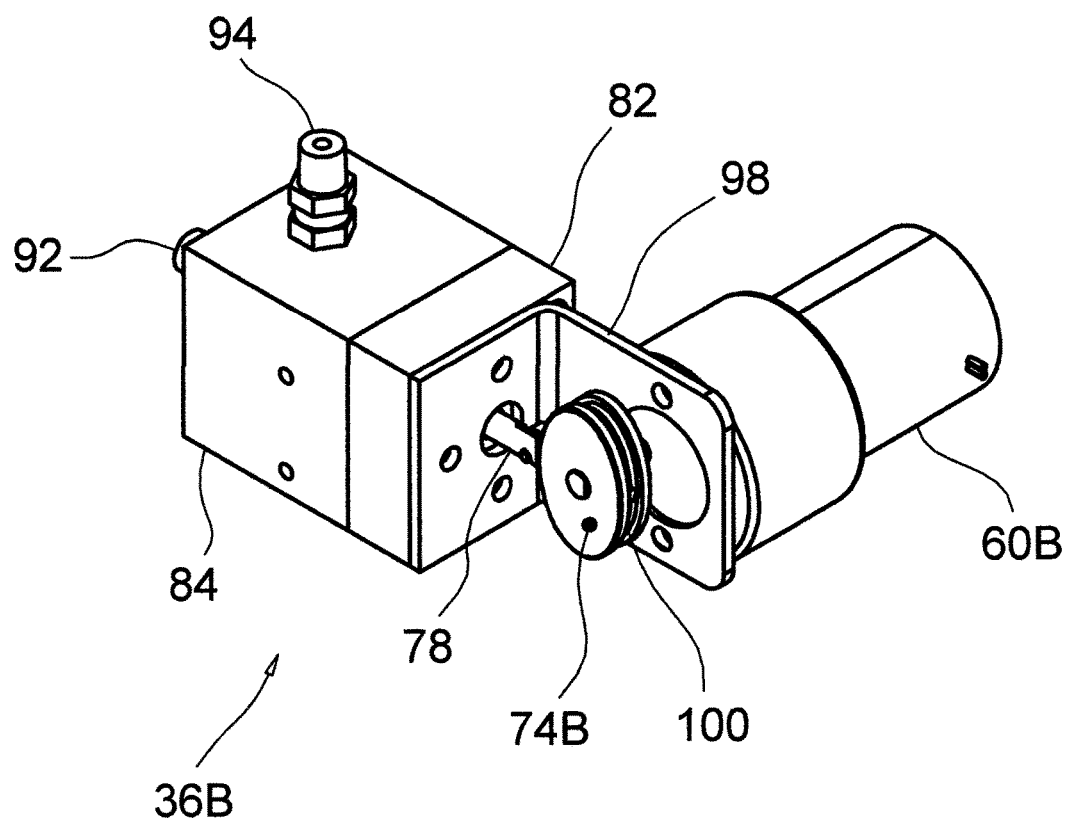
FIG. 11 is an isometric view of an alternate embodiment of an elliptical cam operated fuel additive pump with an easier mounting configuration and an alternatively shaped cam.

A simplified embodiment of the fuel additive pump is shown in FIG. 11. The pump (36B) operates and internally is similarly constructed to the pump (36A) in FIG. 9-10. The main difference is only a single motor mounting plate (98) is employed to mount a motor (60B) using a different bolt pattern. Further, the elliptical cam (74B) contains a groove (100) to capture the piston bearing (76) to keep the piston (78) from rotating. The elliptical cam without a groove (74A) and with a groove (74B) can be made from metal but would preferably be made from a wear resistant plastic such as nylon, UHMWPE, or acetyl.

Figure 12:
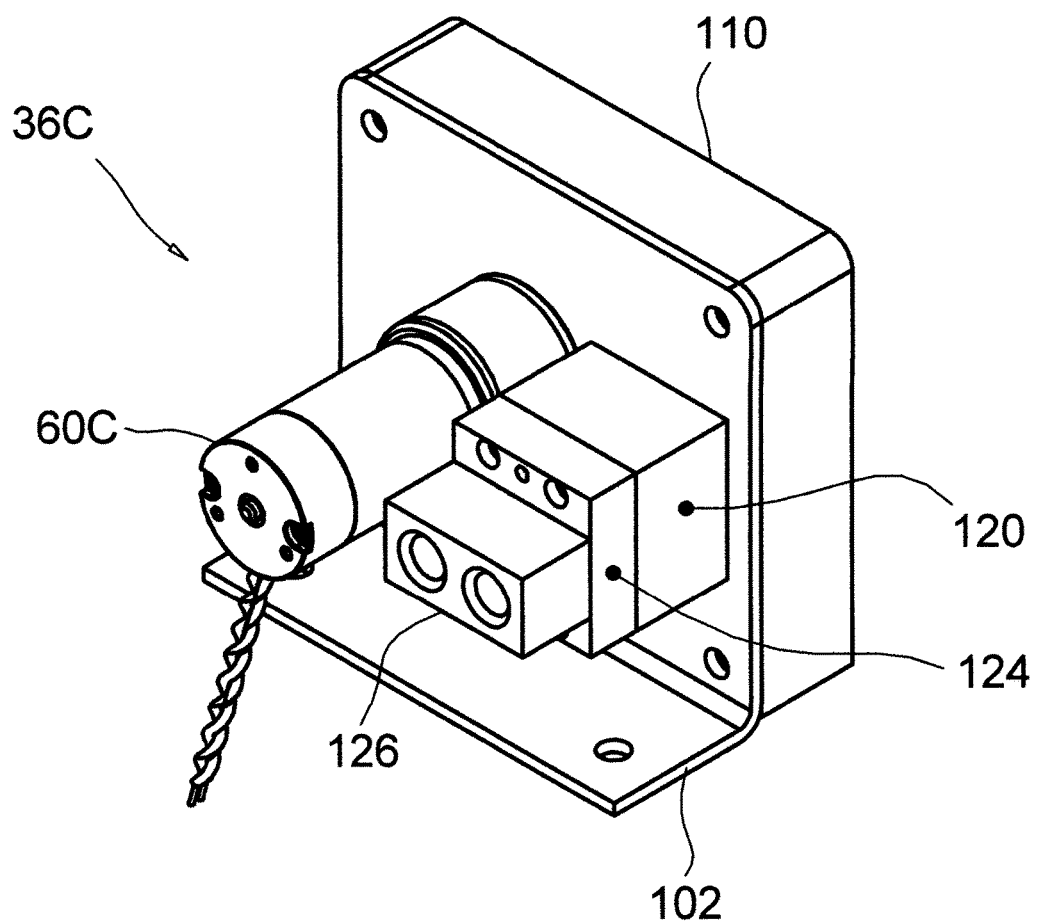
FIG. 12 is an isometric view of a multi-lobed cam operated fuel additive pump in accordance with one embodiment.
Figure 13:
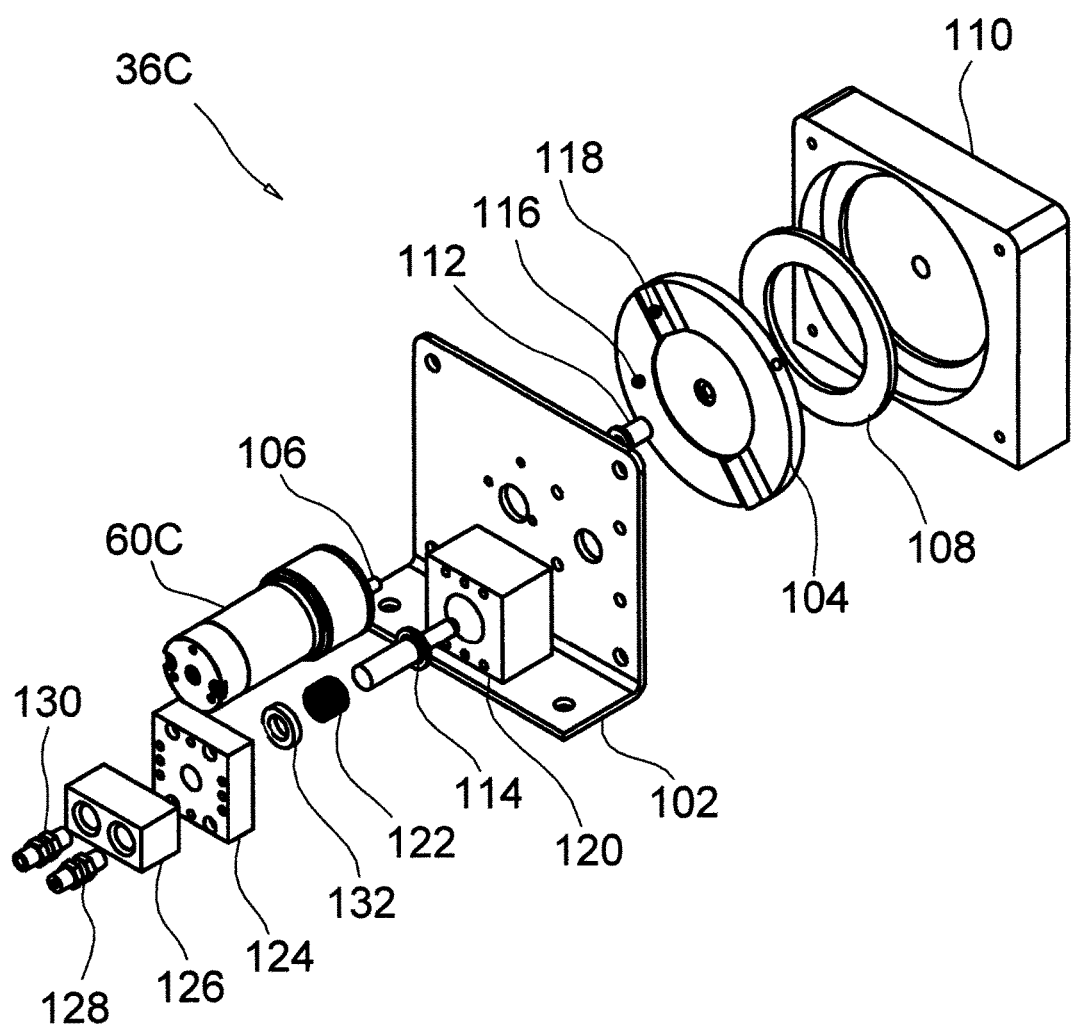
FIG. 13 is an exploded isometric view of a multi-lobed cam operated fuel additive pump in accordance with one embodiment.

Another embodiment of the fuel additive pump is shown in FIGS. 12-13. The pump (36C) consists of an electric motor (60C), attached to a motor bracket (102). A multi-lobed cam disk (104) is mounted to the motor shaft (106). A thrust washer (108) or bearing, inserted in the disk housing (110), and shaft bearing (112) keep the surfaces of the cam disk (104) in the desired position. When the cam disk (104) is rotated, a round end piston (114) contacts the disk surface (116) and lobes of the cam (118). The cam lobes (118) force the piston (114) through an inner housing (120) compressing a spring (122) and into the pump chamber (124). A valve block (126) accepts the inlet (128) and outlet (130) check valves and allow fluid to flow in one direction. A piston seal (132) keeps fluid from escaping through the valve block (126). An optional retaining ring may be used to capture an additional piston seal (not shown) on the round end of the piston (114).

Figure 14:
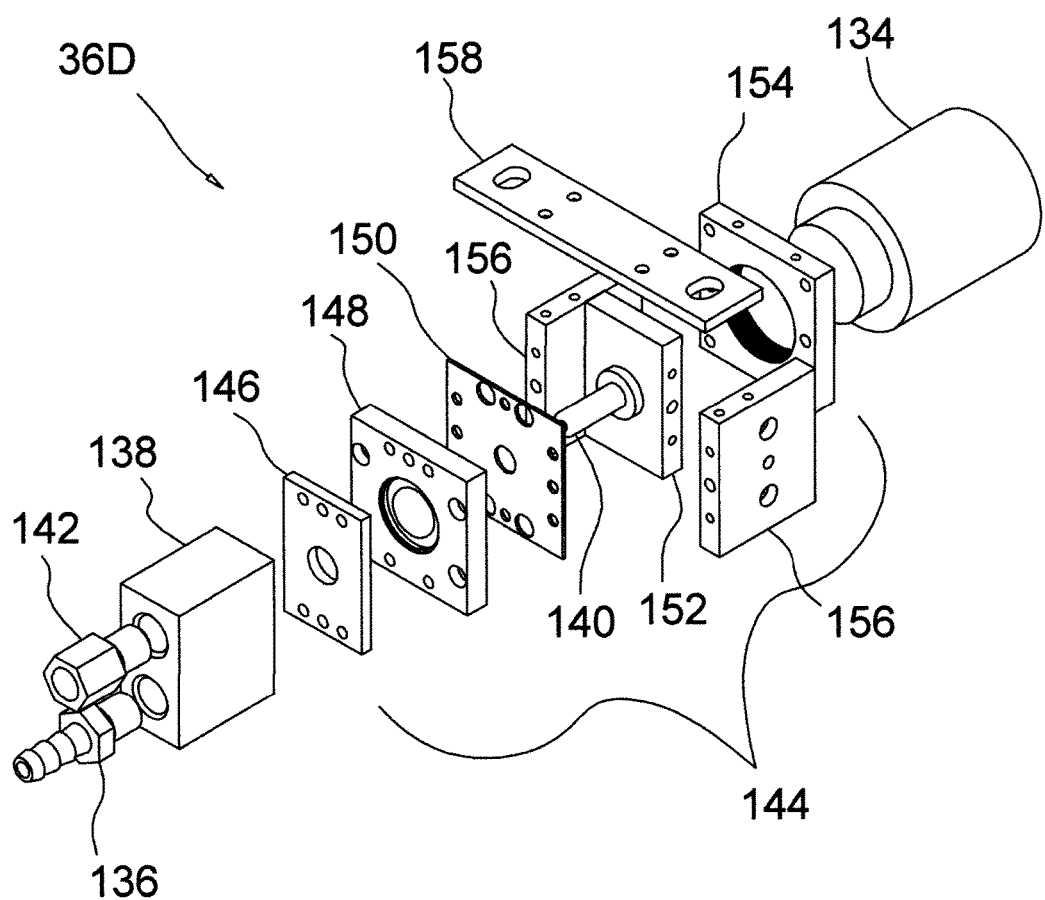
FIG. 14 is an exploded isometric view of a solenoid operated fuel additive pump in accordance with one embodiment.
Figure 15:
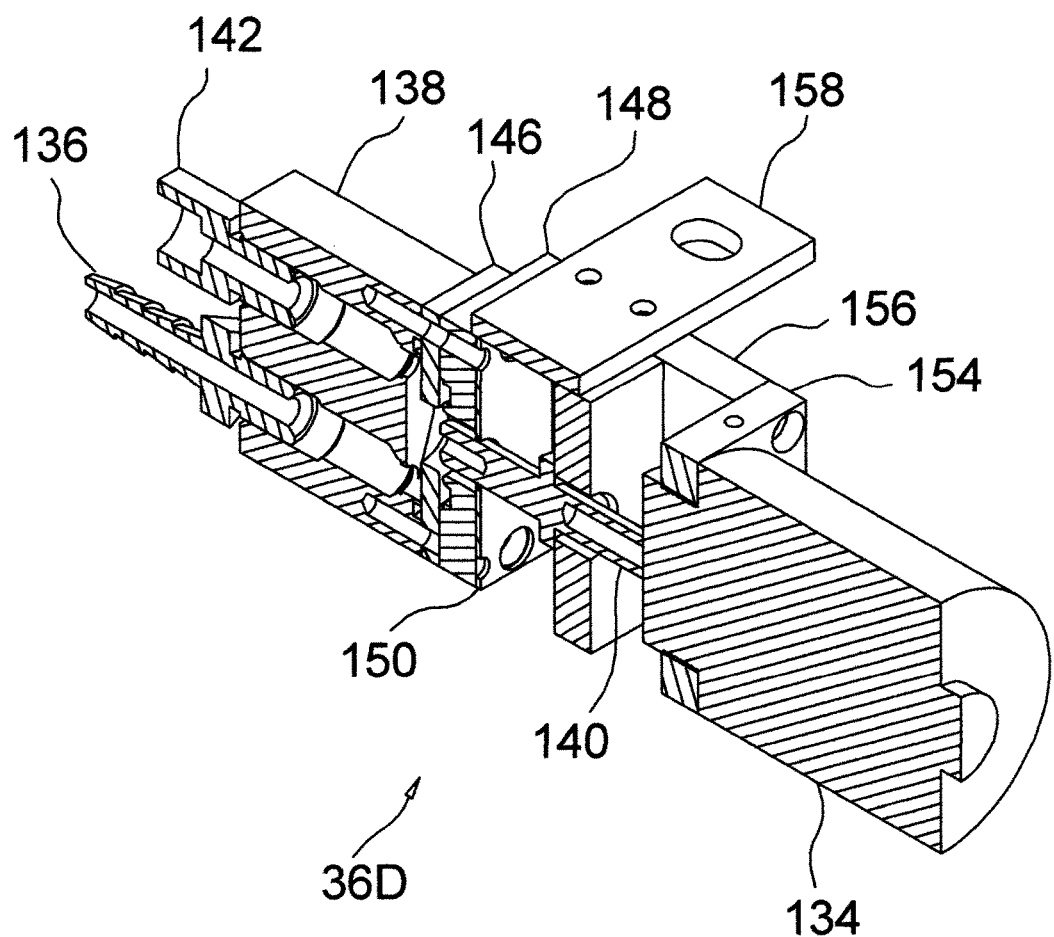
FIG. 15 is a sectional view of a solenoid operated fuel additive pump in accordance with one embodiment.

A further embodiment of the fuel additive pump (36D) is shown in FIGS. 14-15. A solenoid actuator (134) drives fluid within the pump (36D). Liquid fuel additive enters the pump (36D) from the inlet port (136) through the pump body (138). The solenoid actuator (134) of the pump (36D) drives the metering pump piston (140) to provide for a constant volume of additive through the pump outlet check valve (142). The piston housing (144) is comprised of an adapter plate (146), a front support plate (148), a spacer plate (150), a piston support plate (152), a motor mounting plate (154), two side plates (156), and a pump mounting plate (158). If a metering type pump like this is used, it may reduce the need to have a calibrated orifice (160) to control the flow of fuel additive. The preferred construction of this embodiment consists of several flat plates that require minimal manual drilling of the components. These plates may be easily laser or waterjet cut to reduce fabrication costs associated with manual or CNC machining.

Figure 16:
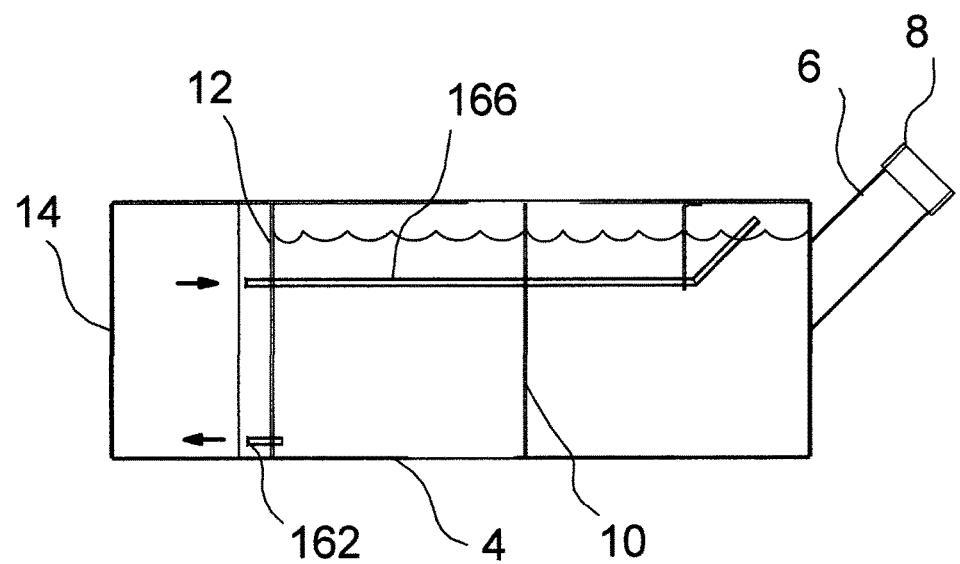
FIG. 16 is a sectional view of a fuel additive tank used in conjunction with the pump shown in FIG. 13 in accordance with one embodiment.

If a metering pump like the one specified in FIGS. 14-15 is not used, a standard pump may require a factory calibrated orifice (160) downstream of the pump (36). The tank and piping diagram using this embodiment is shown in FIGS. 16-17.

The additive passes from the outlet tube (162) of the tank (2), though the pump (36) and though a factory calibrated orifice (160). When the additive is dispensed in this means, the volume of additive is constant and the only variable is the amount of time the pump (36) is operating. The fuel additive recirculates back to the additive tank through a relief valve (164) via a relief tube (166) within the tank (2) until the pump (36) is turned off by a signal from the controller (168).

Figure 17:
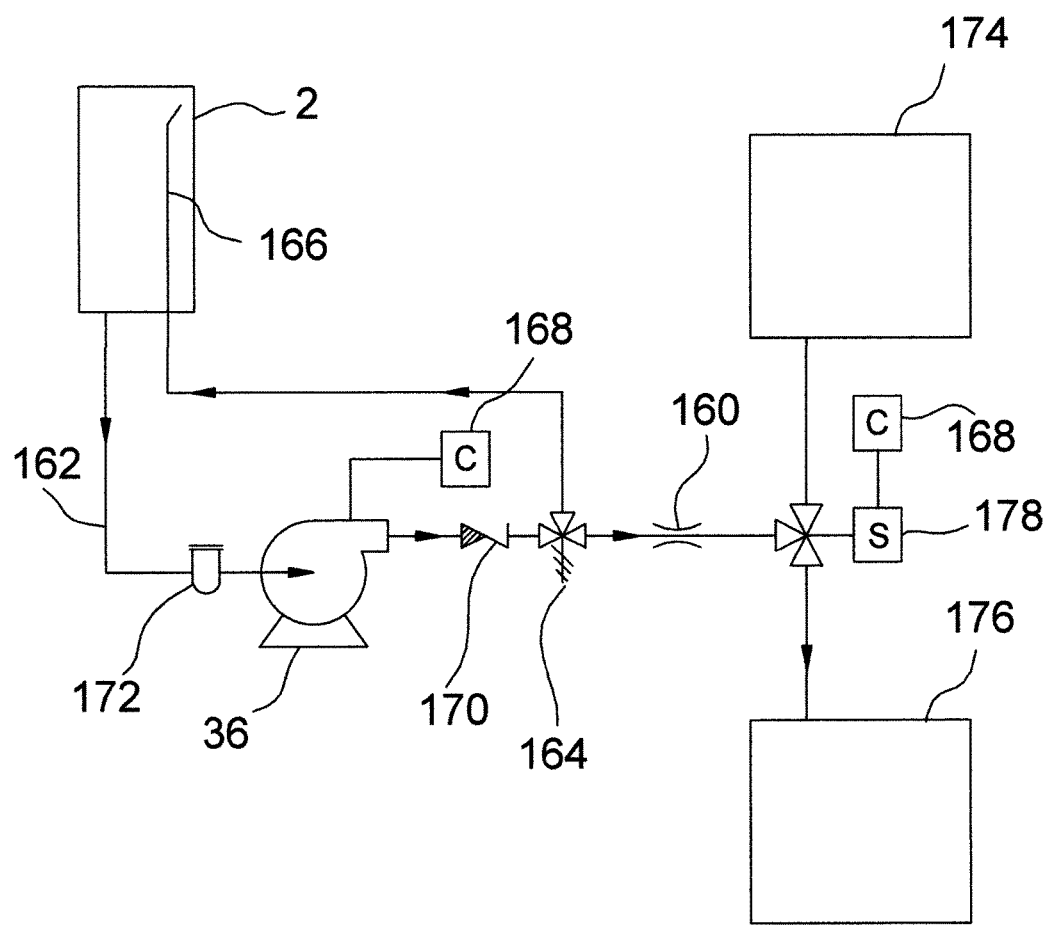
FIG. 17 is a piping and instrumentation diagram showing the pump of FIG. 13 in accordance with one embodiment.

A simplified process & instrumentation diagram FIG. 17 shows a pump with a single check valve (170). Using this arrangement allows for an off the shelf low voltage pump and inline filter (172) to be used with the system.

It is also an advantage of this additive dosing pump, to increase or decrease the amount of time the dosing pump remains on depending on the temperature of the additive in the additive tank (2). As the temperature drops, the viscosity of the additive decreases making the flow decrease through the orifice (160). The controller circuit (168) then increases the amount of time the pump (36) is on to compensate for the thickness of the additive. If the additive is at a very low temperature, for example 20 degrees, the controller (168) starts a delay sequence to allow the engine time to warm the surrounding air and thus the nearby additive tank (2). A heater element (18) may be attached to the bottom of the tank to heat the additive and allow it to flow at very low temperatures.

Another embodiment of a dosing pump (not shown) uses a solenoid to move a diaphragm which supplies fuel additive from the inlet to the outlet port. The diaphragm is preferably constructed of a thermoplastic core such as polypropylene with an exterior surface of a chemical resistant elastomer such as Viton®.

The control unit circuitry preferably contains a switch or the ability to add a switch if desired to switch the flow of fuel additive to either a vehicle fuel tank (174) or a fuel tank of a generator (compressor) for a refrigerated trailer, or reefer tank (176), using a solenoid valve (178).

Although the above description contains many specificities, it should not be construed as limiting the scope of the embodiments. For example, the description above lists many advantages of a fuel additive dosing system, however the embodiments may prove useful for dosing other chemicals used in carwashes and the like.

I claim:
1. A liquid additive dosing device comprising:
   a. a liquid additive tank comprising a fill tube, one or a plurality of baffle plates, an outlet port, and a relief tube, said relief tube further comprising an inlet end and an outlet end, said outlet end of said relief tube being located above said outlet port and inside said additive tank,
   b. an electrically controlled cam driven dosing pump,
   c. an electronic input device containing a timing circuit for starting and stopping said dosing pump,
   d. and a liquid additive filter assembly upstream of said dosing pump, whereby said input device starts or stops said dosing pump based on an entering volume of liquid fuel to be diluted to said input device to deliver a corresponding volume of a liquid additive to a fuel tank of a vehicle, or liquid fueled generator.

2. The liquid additive dosing device of claim 1 wherein said timing circuit of said input device contains a means to delay starting of said dosing pump during ambient temperatures below 30° F.

3. The liquid additive dosing device of claim 1 wherein said timing circuit of said input device contains a means to increase length of operation of said dosing pump during ambient temperatures below 30° F.

4. The liquid additive dosing device of claim 1 wherein said dosing pump comprises a movable diaphragm having a thermoplastic core and a chemically resistant fluoropolymer elastomer coating.

5. The liquid additive dosing device of claim 1 wherein said dosing pump comprises:
   a. an inlet port,
   b. an outlet port,
   c. a slidably mounted piston,
   d. a solenoid or motor to shuttle said piston,
   e. one or a plurality of substantially flat inner plates containing a center bore within close tolerance to the diameter of said piston and mounting holes to locate a fastening means around the perimeter of said center bore,
   f. one or a plurality of substantially flat outer plates parallel to and sandwiching said inner plates containing mounting holes that align with said mounting holes in said inner plates,
   g. and one or a plurality of substantially flat side plates mounted perpendicular to said inner and outer plates.

6. The liquid additive dosing device of claim 1 further comprising an electrically controlled valve to switch flow of said liquid additive to said vehicle fuel tank or said fuel tank of said liquid fueled generator.

7. The liquid additive dosing device of claim 1 wherein said liquid additive tank includes a heater whereby said liquid additive is warmed prior to pumping by said dosing pump during ambient temperatures below 30° F.

8. The liquid additive dosing device of claim 1 wherein said filter assembly comprises:
   a. a cylindrical filter,
   b. a cylindrical filter housing for containing said cylindrical filter,
   c. an inlet port comprising a slidably mounted hollow stem, said hollow stem further comprising an inlet hole, an outlet hole, and a fastening means above said inlet hole to retain said hollow stem,
   d. a compression spring to keep said hollow stem sealed against the top of said cylindrical filter,
   e. an outlet port of said cylindrical filter housing,
   f. and a filter retaining nut, whereby removal of said filter retaining nut and said cylindrical filter allow said compression spring to extend causing said inlet hole of said hollow stem to drop below said liquid additive thus stopping further flow of liquid, and reinsertion of said cylindrical filter and installation of said filter retaining nut compress said compression spring and lift said inlet hole of said hollow stem into said liquid additive.

9. The liquid additive dosing device of claim 1 wherein said dosing pump comprises:
   a. an electrically operated motor,
   b. a pump manifold having an inlet check valve and an outlet check valve,
   c. a slidably mounted piston having a shoulder in substantially the middle of the length of said piston,
   d. a bearing mounted to said piston, the axis of said bearing mounted perpendicular to the axis of said piston,
   e. a rotatable cam having an axis parallel to said axis of said bearing, further having a smooth outer surface contacting an outer race of said bearing,
   f. an outer plate fixed to said pump manifold,
   g. a compression spring surrounding said piston contacting said shoulder of said piston and a sandwiched face of said outer plate,
   h. and one or a plurality of motor mounting plates attached to a face of said outer plate or said manifold perpendicularly mounted to said sandwiched face of said outer plate, whereby said motor rotates said cam causing said bearing and said piston to reciprocate within said manifold and pumping said liquid additive from said inlet check valve through said outlet check valve.

10. The liquid additive dosing device of claim 9 wherein said rotatable cam includes a groove in the outer bearing contacting surface to capture said outer race and a portion of the sides of said bearing.

11. The liquid additive dosing device of claim 1 wherein said dosing pump comprises:
   a. a motor mounting plate having a hole to accept a motor drive shaft and a hole to accept a reciprocating piston,
   b. an electrically operated motor fixed to said motor mounting plate,
   c. a cam disk housing,
   d. a circular cam disk containing an inner face with a plurality of raised lobes, an outer substantially planar face, and a hole for attachment to the rotating shaft of said motor,
   e. a thrust bearing having an inner face contacting said planar face of said circular cam disk and an outer face contacting said cam disk housing,
   f. a slidably mounted piston comprising a shoulder midway the length of said piston, a substantially planar end, and a substantially rounded end,
   g. a pump housing,
   h. a compression spring surrounding said piston with spring ends contacting said shoulder of said piston and said pump housing facilitating constant contact of said rounded piston end and said raised lobes,
   i. an inlet check valve,
   j. and an outlet check valve, whereby said motor rotates said cam disk causing said raised lobes to move said piston into and out of said pump housing inducing flow of liquid additive from said inlet check valve through said outlet check valve.

\* \* \* \* \*